(12) United States Patent
Chava et al.

(10) Patent No.: US 8,532,624 B2
(45) Date of Patent: Sep. 10, 2013

(54) SYSTEM AND METHOD FOR STORING AND RETRIEVING MULTIMEDIA MESSAGES ON LOW-COST TAGS IN ORDER TO FACILITATE CONTEXTUAL COMMUNICATIONS

(76) Inventors: Ven Chava, Herndon, VA (US); Prasad Ravva, South Plainfield, NJ (US)

( * ) Notice: Subject to any disclaimer, the term of this patent is extended or adjusted under 35 U.S.C. 154(b) by 1525 days.

(21) Appl. No.: 12/078,978

(22) Filed: Apr. 9, 2008

(65) Prior Publication Data

US 2009/0258678 A1    Oct. 15, 2009

(51) Int. Cl.
*H04L 12/58*  (2006.01)
*H04B 5/00*  (2006.01)
*G06K 7/10*  (2006.01)

(52) U.S. Cl.
USPC ........... 455/412.1; 455/41.1; 235/462.01; 235/462.09; 235/462.1; 235/462.13

(58) Field of Classification Search
USPC ...................................... 455/412.1
See application file for complete search history.

(56) References Cited

U.S. PATENT DOCUMENTS

| | | | |
|---|---|---|---|
| 7,934,658 B1* | 5/2011 | Bhatti et al. | 235/462.45 |
| 2005/0044179 A1* | 2/2005 | Hunter | 709/218 |
| 2005/0086132 A1* | 4/2005 | Kanitz et al. | 705/28 |
| 2007/0181691 A1* | 8/2007 | Chang | 235/462.41 |
| 2008/0186141 A1* | 8/2008 | Carmeli et al. | 340/10.1 |

* cited by examiner

*Primary Examiner* — Huy C Ho
(74) *Attorney, Agent, or Firm* — PCT Law Group, PLLC

(57) ABSTRACT

Systems, methods and computer program products for storing and retrieving of multimedia messages onto tags in order to facilitate contextual communications are disclosed. Such tags can be attached or affixed to physical, real-world objects thus allowing multimedia messages associated with the tags to be retrieved with the real-world objects in a time-shifted and space-shifted manner from when and where they were recorded. The present invention uses low-cost (metal, paper or plastic) tags—encoded using barcodes or RFID—as virtual message storage units and commercially-available terminals equipped with appropriate software and sensors, such as mobile telephones, as recording and reading devices.

31 Claims, 6 Drawing Sheets

SYSTEM AND METHOD FOR STORING AND RETRIEVING MULTIMEDIA MESSAGES ON LOW-COST TAGS IN ORDER TO FACILITATE CONTEXTUAL COMMUNICATIONS

BACKGROUND OF THE INVENTION

1. Field of the Invention

The present invention generally relates to contextual communications, and more particularly to systems, methods and computer programs for the storage and retrieval of multimedia messages on low-cost barcode or radio frequency identification (RFID) tags, thereby allowing such messages to be affixed to physical, real-world objects.

2. Related Art

In today's technological environment, electronic communications mechanisms can be classified as either Person-to-Person (P2P), Unidirectional, Annotated, Social, Bulletin Board or Machine-to-Machine (M2M) communications. This classification system is based on the type of participants in the communications and usage patterns.

Well known P2P communications paradigms involve a telephone or conference call where persons dial a number to get connected and then talk using audio signals. This method of communication is characterized by its real-time nature and the message exchange is synchronized. Other forms of popular P2P communications methodologies include electronic mail (E-mail), instant messaging, text messaging and Push-to-Talk (i.e., PTT—a method of conversing on half-duplex communication lines, including two-way radio, using a momentary button to switch from voice reception mode to transmit mode). All these communications methodologies are characterized by the presence of named senders and receivers, who are typically known a priori, and use a variety of addressing mechanisms and protocols.

Unidirectional messaging includes items such as News feeds and Web logs (also known as "blogs"). This method of communications has become more popular with the rise in the access to, and use of, the global, public Internet and the World Wide Web (WWW). In this method of communications, the content of any one communication is not typically addressed to any single individual or group of individuals by the sender/publisher. Rather, the content is "pulled" through a browsing mechanism or through a feed reader such as the Real Simple Syndication (RSS) family of Web feed formats. In this method of communication, the receiving parties are usually not known a priori.

Annotated messaging in a shared context is exemplified by such mechanisms as posting comments to an electronic document. Annotated messaging is a good example of contextual communication where messages are attached to a repository of information. This form of communications, however, usually does not name participants.

Social messaging uses tools such as Chat rooms and Internet Relay Chat (IRC) technologies allow group (i.e., many-to-many) communication in discussion forums called channels, and also allow one-to-one communications via private messages over the Internet. The persons involved in this type of discussions are identified using a priori registrations but are not necessarily (personally) known to each other.

Finally, M2M communications involve digital processing units running one or more specialized applications exchanging messages with one another, usually to automate a particular task as encoded by the developers and/or users of the applications.

The above-described mechanisms of electronic communications, while they allow for rapid on-line/electronic communications, all have one deficiency. That deficiency is that they do not allow themselves to be associated with a physical (i.e., real world, non-virtual) context. For example, it would be very valuable to attach a voice message to a (tangible) gift, whereby the recipient of the gift can then easily retrieve the message when receiving the gift. Current mechanisms of sending messages with a gift include a printed or written communication in the form of a short note or a greeting card. There is no "electronic" way to "attach" a message with the physical context. While certain "clumsy" mechanisms can be thought of—such as sending an audio tape with the gift or writing a note containing a URL where an electronic message may be downloaded—there is no simple and elegant way to exchange rich electronic messages that can be tied to physical world contexts.

To further quantify the above-described problem, one need only consider the example of a doctor providing instructions to a patient on the usage of a particular prescription drug. Current mechanisms for receiving such instructions include the patient having to remember the doctor's instructions, or a printed label attached to the drug by the pharmacist with an often cryptic message such as: "Take 3× day with food." There are no easy ways to listen to doctor's (detailed) instructions at the time (and place) of actually taking the drug by the patient. Patients either have to memorize the doctor's instructions or write it down somewhere. Oftentimes, however, the instructions are forgotten or misunderstood.

The two above examples point to a need for contextual communications where electronic messages can be attached or affixed to physical, real-world objects. Currently, there are at least three challenges for developing cost-effective, simple-to-use contextual messaging. First and foremost, there has to be an addressing mechanism to address an electronic communication to a physical world object or context. Second, the mechanics for storing and retrieving the messages have to be simple and intuitive to be of practical use. Third, the systems, methods and computer program products need to be cost effective in order to apply them to the marketplace in any meaningful way.

Given the foregoing, what are needed are systems, method and computer program products for the storing and retrieving of multimedia messages on low-cost tags, such as barcode and RFID tags, thereby facilitating contextual communications where such messages can be attached to physical, real-world objects.

BRIEF DESCRIPTION OF THE INVENTION

The present invention meets the above-identified needs by providing systems, methods and computer program products for storing and retrieving of multimedia messages on low-cost tags, where such messages can be attached to physical, real-world objects.

In one aspect of the present invention, low-cost, bar-coded (metal, paper or plastic) tags are utilized as virtual message stores. Similar to a smart card or a storage memory card, the virtual message allows for storing and retrieving electronic content using an electronic device. In such an aspect, mobile telephones or Personal Computers (PCs) equipped with appropriate software and sensors are utilized as devices for reading and writing messages onto the tags. Further, in such an aspect of the present invention, a backend infrastructure in the form of wireless or wireline communications, network-based computing and a storage facility, is utilized to implement the mechanics of storing and retrieving the messages.

In other aspects of the present invention, mechanisms for: producing and identifying the tags; producing and reading the electronic messages; associating the electronic message virtually to the tags; and establishing secure messaging communications; are provided.

In another aspect of the present invention, low-cost tags to be used as virtual message stores are easily generated such that barcodes can be printed onto them from any available printer and associated software.

Given that barcodes and RFID tags are traditionally used for supply chain applications (e.g., inventory tracking), commerce applications (e.g., checkout counters), etc., the tags display certain characteristics to show that they are used for messaging according to one aspect of the present invention. In such an aspect, this is accomplished by printing appropriate labels and using the same nomenclature used for traditional digital storage media such as CDs, DVDs and flash drives. These traditional digital storage media typically specify a storage device type (i.e., CD, DVD, Memory Stick, etc.), a size (e.g., 500 MB, 1 GB, etc.), and access characteristics (e.g., Read, Read/Write, Recordable, etc.). Together, such information enables users to intuitively use the tags as a storage medium (albeit a virtual storage medium) for recording and accessing content according to aspects of the present invention.

In one aspect of the present invention, a system includes one or more mobile devices which have a messenger application loaded onto their memories, and capable of sending and receiving meta data and multimedia data. The system also includes low-cost tags, each encoded with a unique identifier (e.g., a Universally Unique Identifier (UUID)) and capable of being read by the mobile devices. The system further includes a registry server which stores meta data associated with each of the tags, and capable of communicating such meta data to the messenger applications. The system also includes a media server capable of storing multimedia messages recorded using the mobile devices and capable of communicating with the messenger applications. The tags are capable of being affixed to a physical, real-world object and thus allowing messages recorded by a first user using one of the mobile devices to be retrieved with the real-world object in a time-shifted (temporal) manner and/or a space-shifted (spatial) manner by a second user using a second mobile device.

In one aspect of the present invention, a method includes the steps of encoding a tag with a unique identifier, utilizing a mobile device to read the unique identifier, receiving, at a registry server, the unique identifier from the mobile device, accessing meta data associated with the tag from the registry server using the unique identifier, sending the meta data associated with the tag from the registry server to the mobile device, utilizing the meta data, at the mobile device, to allow a user to record a message associated with the unique identifier, and storing the message onto a media server. The method also includes the steps of affixing the tag to a physical, real-world object and thus allowing the message to be retrieved with the object in a time-shifted and/or space-shifted manner from when and/or where the message was recorded.

In alternate aspects of the system and method: the mobile device involved in the recording (i.e., writing) and reading operations may be the same device or two different devices; the tag used for reading and writing are physically different, but encoded with the same globally unique identifier(s); and/or a security code is encoded on the tag that needs to be inputted by a user while recording or reading the contents associated with the tag.

An advantage of aspects of the present invention is that it combines the best aspects of digital and physical world assets to generate and retrieve messages using mobile devices and low-cost tags.

An advantage of aspects of the present invention is that it provides an addressing mechanism to facilitate cost-effective, simple-to-use contextual messaging.

Another advantage of aspects of the present invention is that the mechanics for storing and retrieving messages is simple and intuitive such as to be of practical use.

Another advantage of aspects of the present invention is that it is cost effective thereby allowing for application to today's marketplace in a meaningful way.

Yet another advantage of aspects of the present invention is that patients can now "click" on their prescription drugs to get instant usage instructions without the need to memorize their doctor's instructions or write it down while during their visit to the doctor's office.

Yet another advantage of aspects of the present invention is that it exploits the fact that, in today's technological climate, both bar-coded and RFID tags cost pennies, and tags can be easily bar-coded using any available printer and associated (widely-available) software.

Yet another advantage of aspects of the present invention is that it utilizes the UUID standard in order to guarantee that each tag is uniquely identifiable in order to facilitate the storage and retrieval of information. In such aspects, the UUID numbering system has enough capacity to tag every possible object in the universe which is where traditional barcode, UPC product codes or ISBN numbers fell short because they identify classes of products, not necessarily unique physical entities or instances.

Yet another advantage of aspects of the present invention is that a user may specify the attributes of a tag at the time of creation in order to simplify the user interface (and thus, enhance the user experience). For example, a user may specify and generate a "voice only" tag. This eliminates the step of pressing multiple buttons to record audio. Then, once the message is recorded and stored in a database, the tag may be scanned during a retrieval process such that the content will be automatically presented to the user.

Yet another advantage of aspects of the present invention is that well-established directory service mechanisms may be employed for controlling data access and ensuring information security by treating the tags as traditional data stores.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Figure 1:
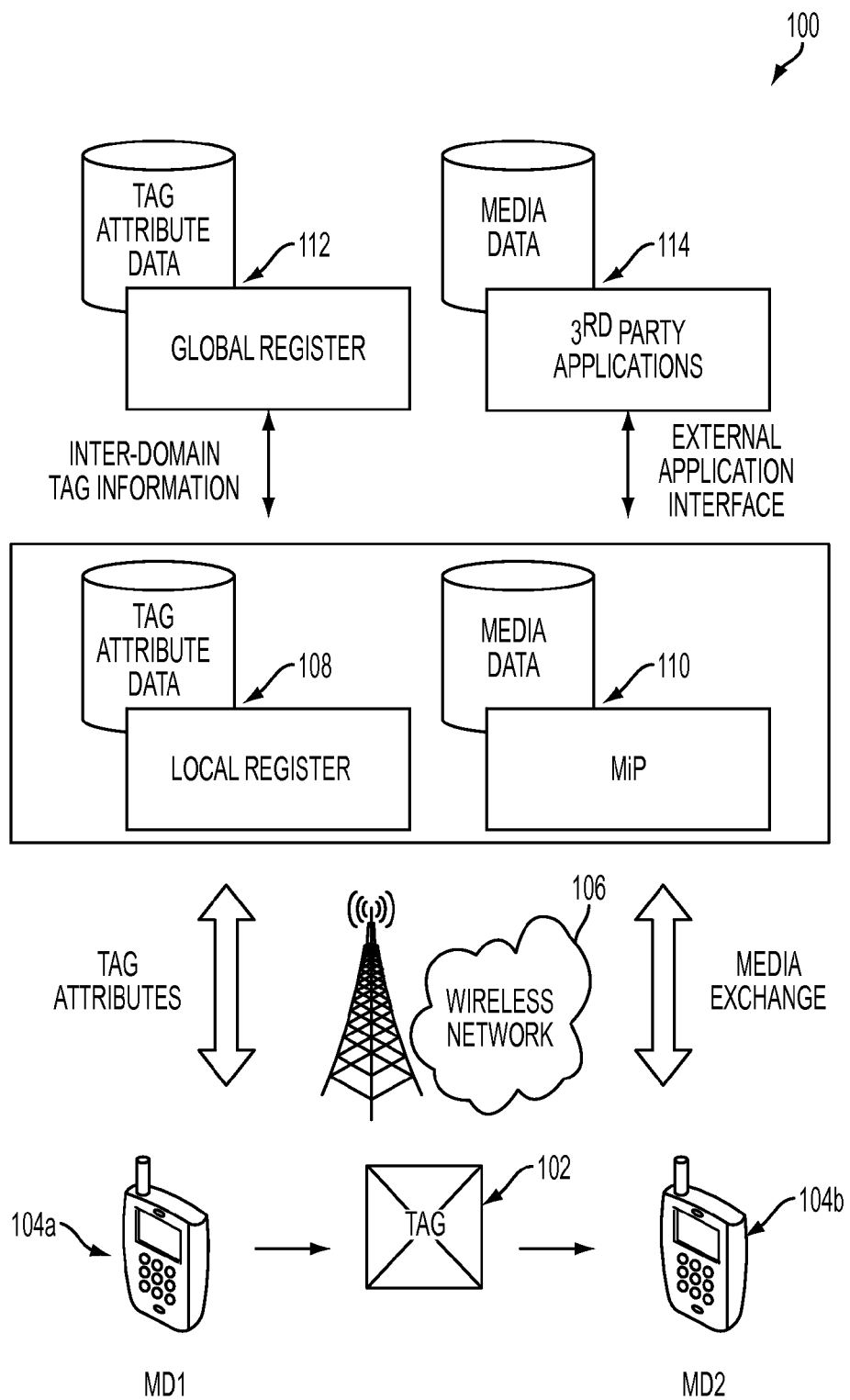
FIG. 1 is a block diagram of an exemplary contextual messaging system architecture according to one aspect of the present invention.

The present invention is directed to systems, methods and computer program products for storing and retrieving of multimedia messages on low-cost tags, where such messages can be attached or affixed to physical, real-world objects.

In one aspect of the present invention, an intuitive way to store and retrieve multimedia messages using low-cost barcode or RFID tags, rather than conventional digital mechanisms such as voice mail, SMS, email, etc., physical resources such as paper (e.g., letters, note paper, Post-it® notes, etc.), or verbal communications either directly or by telephone.

In another aspect of the present invention, a universal resource number mechanism such as the UUID standard promulgated by the Open Software Foundation (and documented in ISO/IEC 11578:1996, which is incorporated by reference herein in its entirety) is used to uniquely identify the low-cost tags without significant central coordination. As will be appreciated by those skilled in the relevant art(s), a UUID in its most basic form is a 128-bit number frequently displayed as 32 hexadecimal digits, displayed in 5 groups separated by hyphens in the form 8-4-4-4-12 for a total of 36 characters (e.g., "550e8401-e28c-42d4-a726-446655440000").

In other aspects of the present invention, a user may specify the attributes of a tag at the time of creation in order to simplify the user interface. For example, a user may specify whether the tag is meant to store text, audio, pictures and/or video. In such aspects, multiple messages may be recorded onto the tag, and when it is scanned to retrieve messages, the user may also specify the order in which the content needs to be presented or played. As will be appreciated by those skilled in the relevant art(s) after reading the description herein, the user may specify how the tags behave during recording and playback: as a queue (i.e., first-in-first-out (FIFO)); as a stack (i.e., last-in-first-out (LIFO)); or as a "scratch pad" memory.

In other aspects of the present invention, directory service mechanisms using well established corporate standard practices may be employed to allow for data access. That is, many enterprises already define users, their roles and data access control mechanisms. By treating the tags as traditional data stores, the same principles may be applied for controlling data access and ensuring information security, all without any "username and password" schemes which can be particularly cumbersome on mobile devices.

The present invention is now described in more detail herein in terms of the above exemplary context. This is for convenience only and is not intended to limit the application of the present invention. In fact, after reading the following description, it will be apparent to those skilled in the relevant art(s) how to implement the following invention in alternative aspects (e.g., using different low-costs tags, affixing the tags to other real-world objects not mentioned herein and the like).

The terms "entity," "organization," "firm," "company," "business," "individual," "patient," "doctor," "recipient," "giver," and/or the plural form of these terms are used interchangeably throughout herein to refer to those persons and entities would benefit from the systems, methods and computer program products that the present invention provide for storing and retrieving of multimedia messages on low-cost tags affixed to physical, real-world objects.

Referring to FIG. 1, a block diagram illustrating an exemplary contextual messaging system architecture 100 for facilitating the storing and retrieving of multimedia messages onto low-cost tags according to an aspect of the present invention is shown.

In such an aspect, system 100 includes a one or more low-cost (metal, paper or plastic) tags 102, such as a bar-coded or RFID tags, capable of being affixed or attached to real-world physical objects. In alternate aspects of the present invention, tags 102 may be a billboard, an LCD screen or the like.

As will be appreciated by those skilled in the relevant art(s), barcodes are ubiquitous and can be found on almost every product that is sold, transported goods, many documents such as letters, postal envelopes, industrial parts and components, groceries and just about anything that needs to be tracked, sold or categorized. There are many barcode technologies/standards that are in use today. Most common are the so-called 1-dimensional codes. In 1-dimensional codes, data is encoded in one dimension, usually horizontal with redundancy in the vertical direction. Examples of such barcode standards include UPC-A, EAN, Postnet, and UCC/EAN 128. In addition, it is possible to store data in two dimensions (both horizontal and vertical). These are referred to as 2D barcodes which usually have higher capacity than their 1-Dimensional counterparts. Examples of 2D barcodes include Data Matrix, MaxiCode and QR Code. There are even emerging 3D barcodes, some microscopic in nature for high value items are in development. In aspects of the present invention, differing types of barcodes, all with sufficient storage capacity are utilized (e.g., the Data Matrix standard).

As will be appreciated by those skilled in the relevant art(s), Radio Frequency Identification (RFID) is an automatic identification technology similar in application to bar code technology, but uses radio frequency instead of optical signals. An RFID system consists of two major components—a reader and a tag. They work together to provide the end user with a non-contact solution to uniquely identify objects. The reader performs several functions, one of which is to produce a low-level radio frequency magnetic field that serves as a "carrier" of power from the reader to the RFID tag. A passive RFID tag contains an antenna and an integrated circuit (IC). The IC requires only a minimal amount of electrical power to function. The antenna in the tag provides a means for gathering the energy present in the magnetic field produced by the reader, and converts it to an electrical signal for use by the IC. When a tag is brought into the magnetic field produced by the reader, the recovered energy powers the IC, and an electromagnetic signal modulated with data in the memory is transmitted by the tag's antenna. The electromagnetic signal transmitted from the tag is recovered by an antenna within the reader, and converted back into an electrical form. The reader contains a sensitive receiving system that is designed to detect and process the weak tag signal, demodulating the original data stored in the tag memory. As opposed to passive tags, active tags contain a miniature battery that provides the operating power for the IC. When interrogated by the reader, the IC broadcasts a signal that identifies itself to sensitive reader detection and data transmission circuits. This allows the tag to begin sending its data at a considerably greater distance from the reader than its passive counterpart. Additionally, an active tag uses battery energy to produce a much stronger electromagnetic response signal. This results in a significantly greater read range than a passive tag.

Thus, in alternate aspects of the present invention, a tag 102 may be any NFC compliant tag such as NFC Forum Type 2, NFC Forum Type 4, MIFARE® UltraLight, MIFARE® DESFire and the like.

In one aspect of the present invention, tags 102 within system 100 may have the following attributes (i.e., meta data) listed in Table 1.

TABLE 1

Attributes of Virtual Storage Tag

| Attribute | Values | Description |
|---|---|---|
| Memory Type: | R | Read Only |
| | W | Write Only |
| | Rec | Recordable |
| | WORM | Write Once Read Many |
| Memory Size: | 1-N Kbytes | Storage size typically in kilo or mega bytes |
| Content Type: | Any of the Internet standard MIME content types according to RFC 2045 and RFC 2046 (each of which is hereby incorporated herein by reference in its entirety) | Content types such as TEXT, AUDIO, VIDEO, IMAGE are allowed. |
| Access Control: | PUBLIC | Anyone can access the content |
| | PRIVATE-<Domain List> | Devices belonging to certain domains have access |
| Structure: | LIFO | Last in First Out Memory |
| | FIFO | First In First Out Memory |
| | Random | Random Access Memory |
| Preview: | Yes | Preview of message is available |
| | No | Preview of message is not available |
| Current Content | Universal Resource Identifier (URI) Link to Database or NULL | URI of the content stored in the database in the network |

In such an aspect, system 100 includes one or more terminals 104 with multimedia capability and equipped with appropriate software and sensors for reading from and writing to tags 102. Terminals 104 may be mobile telephones (shown as mobile devices 104a and 104b in FIG. 1), PCs, minicomputers, laptops, palmtops, mainframe computers, microcomputers, personal digital assistants (PDAs) or any other like device having a processor and input and display capability for handling multimedia.

System 100 also includes a wireless network 106 for network connectivity between tags 102 and other components of contextual messaging system 100. In alternate aspects of the present invention, network 106 may utilize one or more transmission protocols such as ZigBee (802.15.4), Cellular (CDMA, TDMA, GSM and others), Wi-Fi, ANT, Bluetooth (802.15.1), or custom wireless protocols working in one or more available frequencies.

In such an aspect, system 100 also includes a local registry server (with an associated data store) 108 for storing the attributes of tags 102, a multimedia server (with an associated data store) 110 for storing and retrieving messages, a global registry 112 for reconciling inter-domain communications and a third-party server (with an associated data store) 114 to connect system 100 to third-party applications such as trouble management systems, content management systems, customer relationship management (CRM) tools and other Internet or Enterprise applications.

Figure 2:
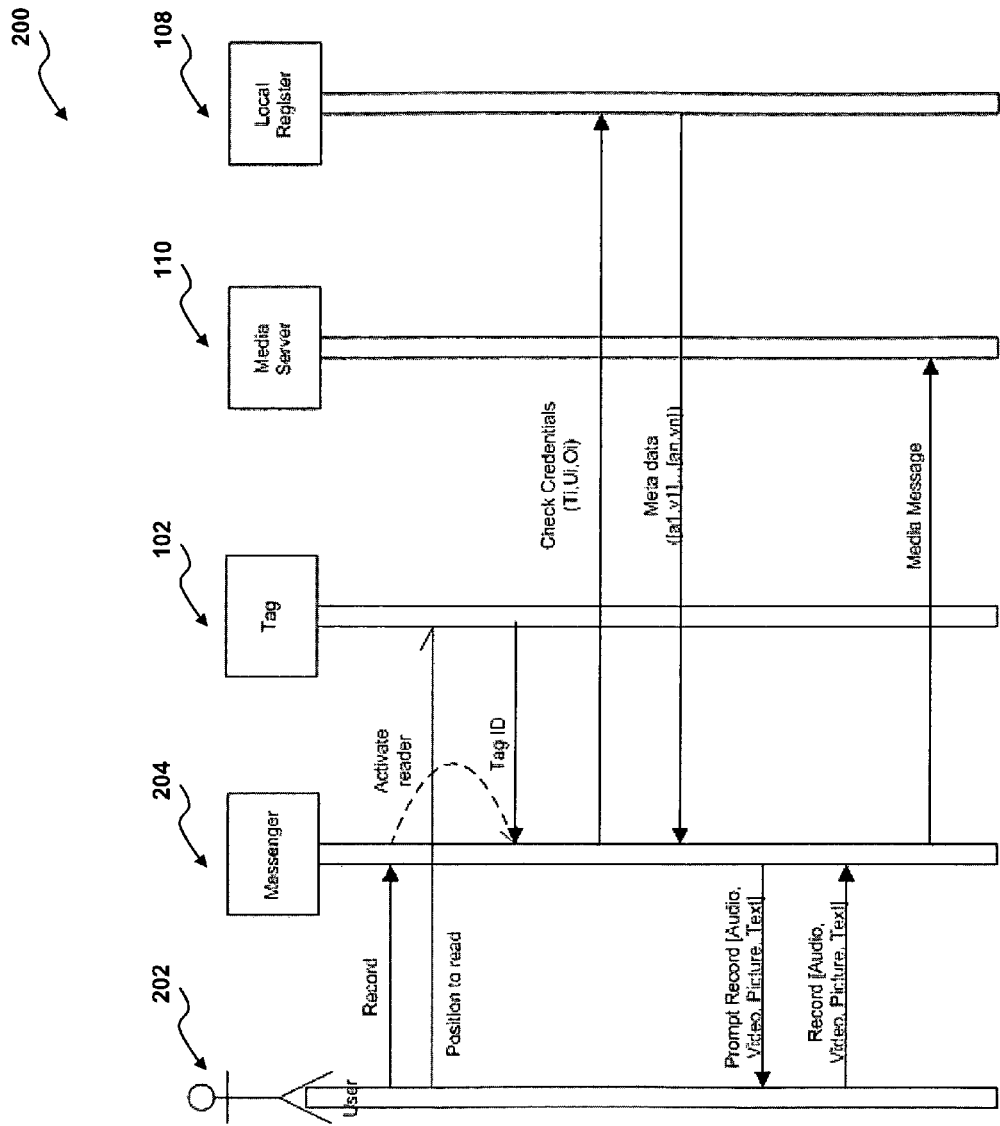
FIG. 2 is a data flow diagram of an exemplary mechanism for storing a message on a virtual message store according to an aspect of the present invention.

Referring to FIG. 2, a data flow diagram 200 of an exemplary mechanism for storing a message on a virtual message store according to an aspect of the present invention is shown. That is, in such an aspect, flow 200 involves the virtual storing of information (i.e., one or more messages) onto tag 102.

In such an aspect, a user 202 activates a messenger application 204, that can send and receive meta data and multimedia data from various network connected servers, running on a terminal 104 (e.g., mobile device 104a such as the Nokia NFC 6131 mobile telephone). Then, user 202 positions a sensor on mobile device 104 (e.g., a camera or RFID reader chip embedded in a mobile telephone) near tag 102. Messenger application 204 then reads tag 102 and contacts local register 108. Then, local register 108 looks up its service registry and sends meta information about tag 102 (see Table 1) back to messenger application 204. The messenger application, based on the meta information received from local register 108, may display one or more permissible actions for user 202 to pursue. The actions may include Record Message, Read Message, Delete Message, etc. The messenger application displays the permissible actions as a menu prompt to user 202. User 202, in this particular example, chooses to select Record audio, and then records a message. Once recorded by user 202, the message is then sent to media server 110 for storage.

As will be appreciated by those skilled in the relevant art(s) after reading the description herein, messenger application 204, in an aspect of the present invention, is a software module loaded onto mobile device 104. Messenger application 204 has the capability to interact with the attached camera unit to take pictures and read encoded information from tag 102, it has the capability to interact with Internet and Enterprise networks through IP-based protocols and it has ability to access information and other applications, such as browser or media recording application programming interfaces, available on mobile device 104. In other aspects, messenger application 204 has the capability to interact with Near Field Communication (NFC) reader equipment available on some mobile devices 104 (e.g., the Nokia NFC 6131 telephone). Overall, the purpose of messenger application 204 is to be able to read tags, interpret the encoded data, offer the ability to record and play back voice (and other media such as video, text and/or any combination thereof) recordings and store/retrieve information from network-based servers.

As will be appreciated by those skilled in the relevant art(s), NFC is an open platform technology specifying short-range, high-frequency wireless communication technology which enables the exchange of data between devices over about a four-inch distance, and standardized in ISO/IEC 18092/ECMA-340: Near Field Communication Interface and Protocol, which are hereby incorporated by reference herein in their entirety.

Figure 3:
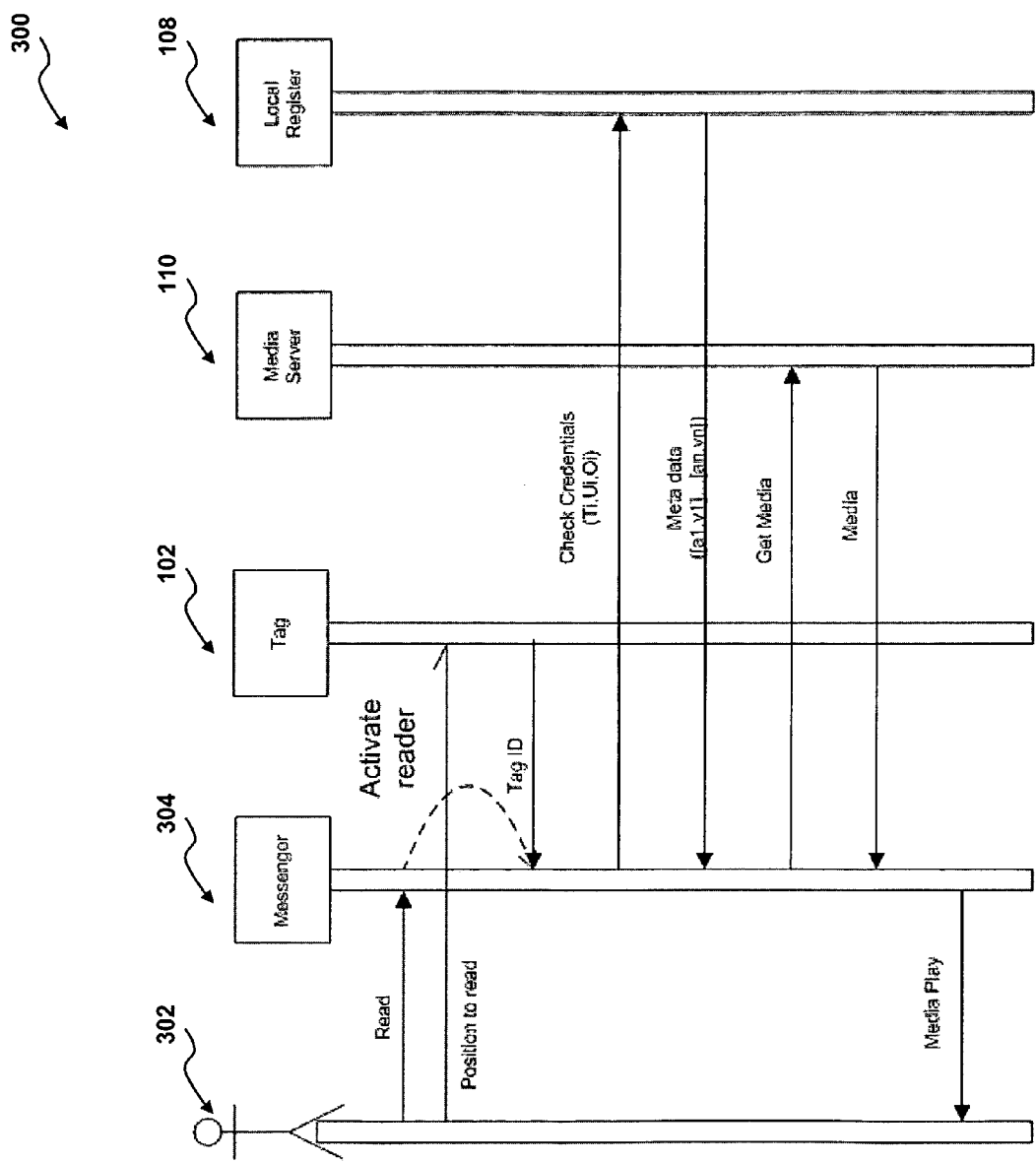
FIG. 3 is a data flow diagram of an exemplary mechanism for reading a message from a virtual message store according to an aspect of the present invention.

Referring to FIG. 3, a data flow diagram 300 of an exemplary mechanism for reading a message from a virtual message store according to an aspect of the present invention is shown. That is, in such an aspect, flow 300 involves information retrieval from virtual storage tag 102.

In such an aspect, a user 302 activates a messenger application 304 running on a terminal 104 (e.g., mobile device 104b). Then, user 302 positions a sensor on mobile device 104 (e.g., a camera or RFID reader chip embedded in a mobile telephone) near tag 102. Messenger application 304 then reads tag 102 and contacts local register 108. Then, local register 108 looks up its service registry and sends meta information about tag 102 (see Table 1) back to messenger application 304. In one aspect, the meta information may command messenger application 304 to receive a message from media server 110. Messenger application 304 then contacts media server 110 to retrieve the message, and then plays the message to user 302 on terminal 104.

As will be appreciated by those skilled in the relevant art(s) after reading the description herein, user 202/messenger application 204 and user 302/messenger application 304 may or may not be the same person or application, respectively. That is, user 202 who records the message may or may not be the same person who then retrieves the message depending on the application of system 100 (e.g., a doctor recording directions for a patient, a patient recording instructions for themselves to listen to later, or a gift giver attaching a message to a gift recipient). Further, messenger applications 204 and 304 would differ based on the type of terminal device 104 being employed by users 202 and 302, respectively.

As will be appreciated by those skilled in the relevant art(s) after reading the description herein, system 100 may have a local register 108 for each enterprise or customer for the purpose of maintaining security and enforcing access policy rules. Thus, the local register 108 shown in FIGS. 2 and 3 may or may not be the same local register in alternate aspects of the present invention.

Figure 4:
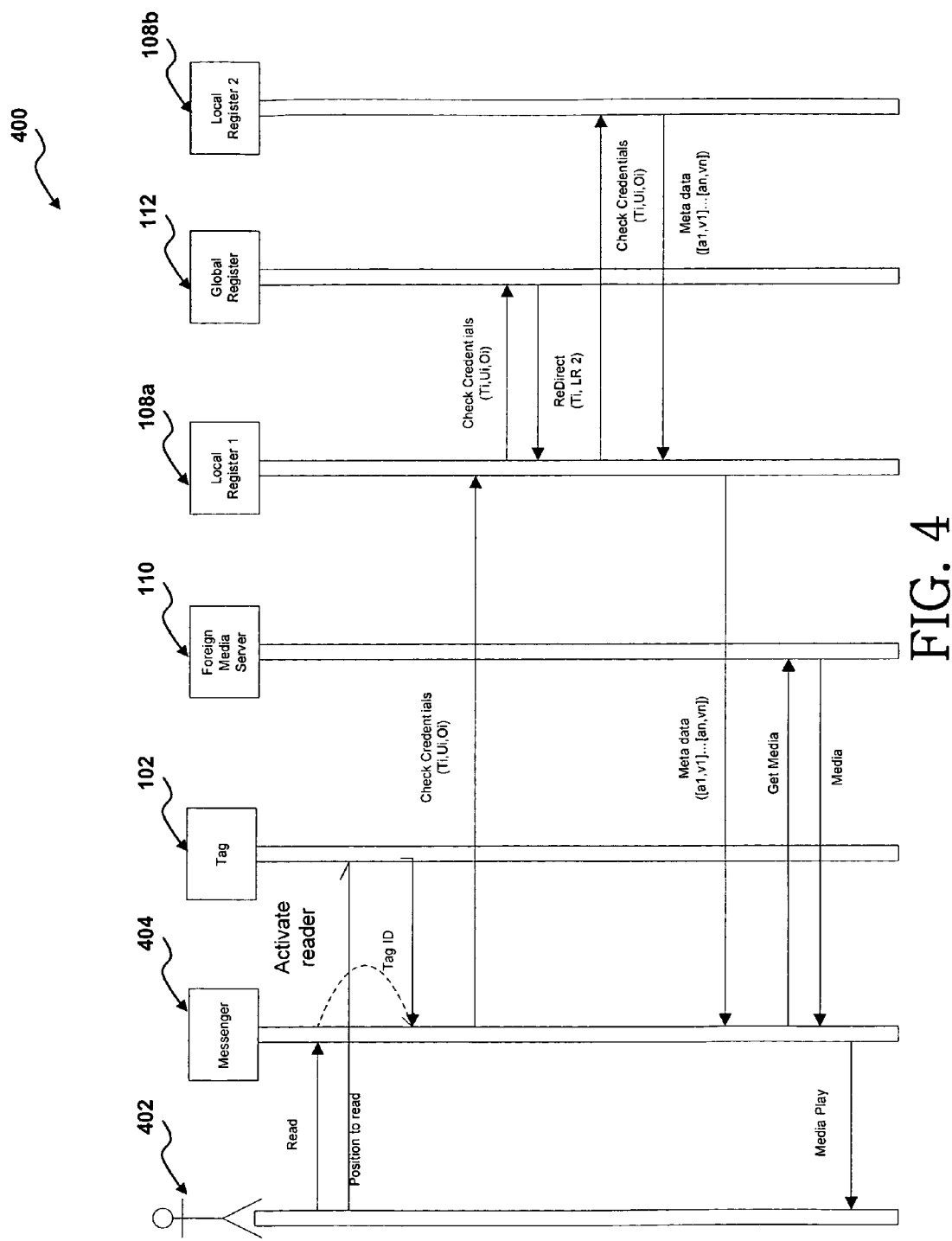
FIG. 4 is a data flow diagram of an exemplary inter-domain message reading mechanism according to an aspect of the present invention.

Referring to FIG. 4, a data flow diagram 400 of an exemplary inter-domain message reading mechanism according to an aspect of the present invention is shown.

In such an aspect, when a tag 102 is read, a messenger application 404 contacts a first local register (LR1) server 108a associated with that domain. In one aspect, the domain is pre-determined for every messenger application 404 client loaded onto a mobile device 104. The LR1 server 108a checks if the identifier associated with tag 102 is registered in its associated database. If not, then it might be a case of the tag belonging to a different functional domain (such as an Enterprise not served by the current local register server) or service provider. The LR1 server 108a would then contact a global register 112 through "Check Credentials" message. Global register 112 would then check its associated database for registration information about tag 102.

As will be appreciated by those skilled in the relevant art(s) after reading the description herein, the "Check Credentials" message in an aspect is comprised of at least three parameters: Ti—the tag ID; Ui—the user ID; and Oi—the operation ID.

In an aspect of the present invention, only those tags identified for inter-domain communications by a service provider are listed within global register 112. Global register server 112 would then send, through a Redirect message, the address of a second (foreign) local register (LR2) server 108b which holds information for tag 102. LR1 would then contact LR2, through Check Credentials message, to obtain metadata about the tag, such as attributes associated with the tag and the applicable media server 110 which stores and serves the content (i.e., multimedia message) for the tag. The attribute information received by LR1 108a, through "Meta Data" message, is then sent to the messenger application 404. As will be appreciated by those skilled in the relevant art(s) after reading the description herein, the "Meta Data" message in an aspect is comprised of at least one [attribute, value] pairs (denoted as [$a_n$, $v_n$] pairs in FIG. 4). Depending upon the attributes, messenger application 404 provides appropriate options to user 402. User 402 can either read the message, or record a message. In case of recording, messenger application 404 sends the recorded information directly to foreign media server 110.

As will be appreciated by those skilled in the relevant art(s) after reading the description herein, system 100 may utilize one or more of the UDP, TCP, SIP, FTP, HTTP, RTP and like protocols for the reading and writing operations onto media server 110 (as shown in data flow 200, 300 and 400) in alternate aspects of the present invention.

Figure 5:
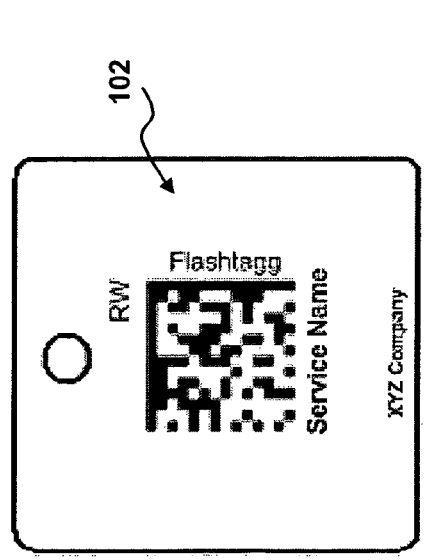
FIG. 5 is a block diagram of an exemplary bar-coded tag used as a virtual message store according to an aspect of the present invention.

Referring to FIG. 5, a block diagram of an exemplary bar-coded tag 102 used as a virtual message store according to an aspect of the present invention is shown. Tag 102 shows a two-dimensional matrix barcode encoded with an identifier. In such an aspect, the surface of tag 102 would be labeled with a company name, service name (e.g., audio notes) and the marketing brand name of the tag (e.g., Flashtagg™ as shown in FIG. 5). Further, the surface of tag 102 is labeled with a characteristic of the tag. For example, the letters "RW", which stand for "Read and Write", is displayed on tag 102. This lets users know that tag 102 can be used for both reading and recording a message.

Figure 6:
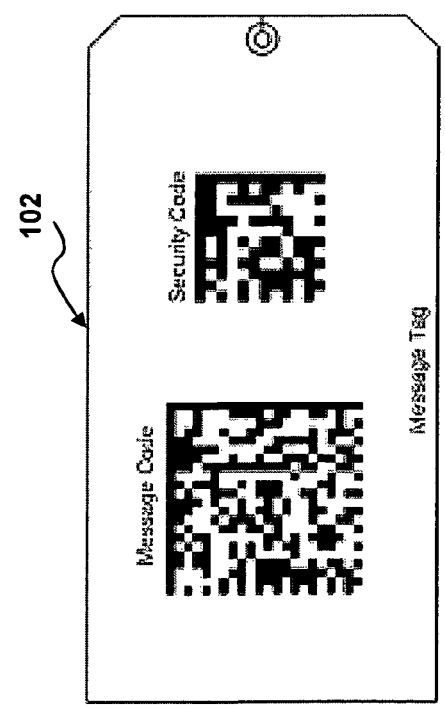
FIG. 6 is a block diagram of an exemplary security-encoded tag according to an aspect of the present invention.

Referring to FIG. 6, a block diagram of an exemplary security-encoded message tag 102 according to an aspect of the present invention is shown. In such an aspect, tag 102 is comprised of a tag encoded with a message code used for generating and reading contextual messaging and another tag encoded with a security code. The purpose of the security code is to add an extra layer of protection so that the device used for reading needs to read and match both of the codes in order to perform a valid operation, such as reading or writing a message onto the tag. Adding a security code separately, as shown instead of in the main message code, reduces the size of the barcode. In general, the more characters there are, the bigger the barcode size is. In addition, the security code can also be "pasted" or applied onto a pre-printed tag and activated when a read or write operation is done on the tag by a mobile device. The advantage of this method is that it adds an additional layer of security to reduce the possibility of an unauthorized person guessing the codes and trying to read messages by randomly printing the codes.

Figure 7:
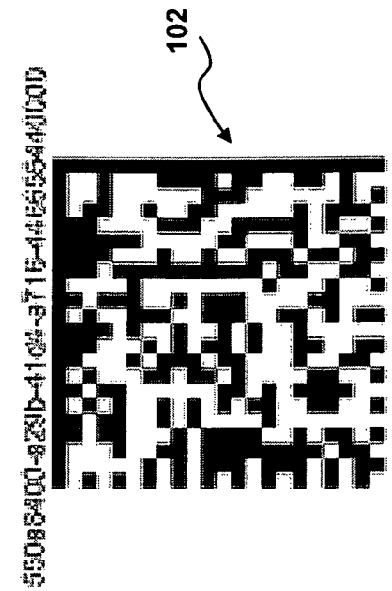
FIG. 7 is a block diagram of an exemplary UUID-encoded tag according to an aspect of the present invention.

Referring to FIG. 7, a block diagram of an exemplary UUID-encoded, two-dimensional matrix tag 102 according to an aspect of the present invention is shown. In such an aspect, the UUID information may also be printed on the surface of tag 102. The UUID code, as will be appreciated by those skilled in the relevant art(s), can be generated and managed independently using multiple computer systems. That is, the barcodes or tags 102 can be generated by users of the present invention independently, yet still can be guaranteed to be globally unique. This removes the overhead of centrally managing and assigning identifiers to tags 102 by a single database system.

The present invention (i.e., system 100, data flow 200, 300, or 400 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 8:
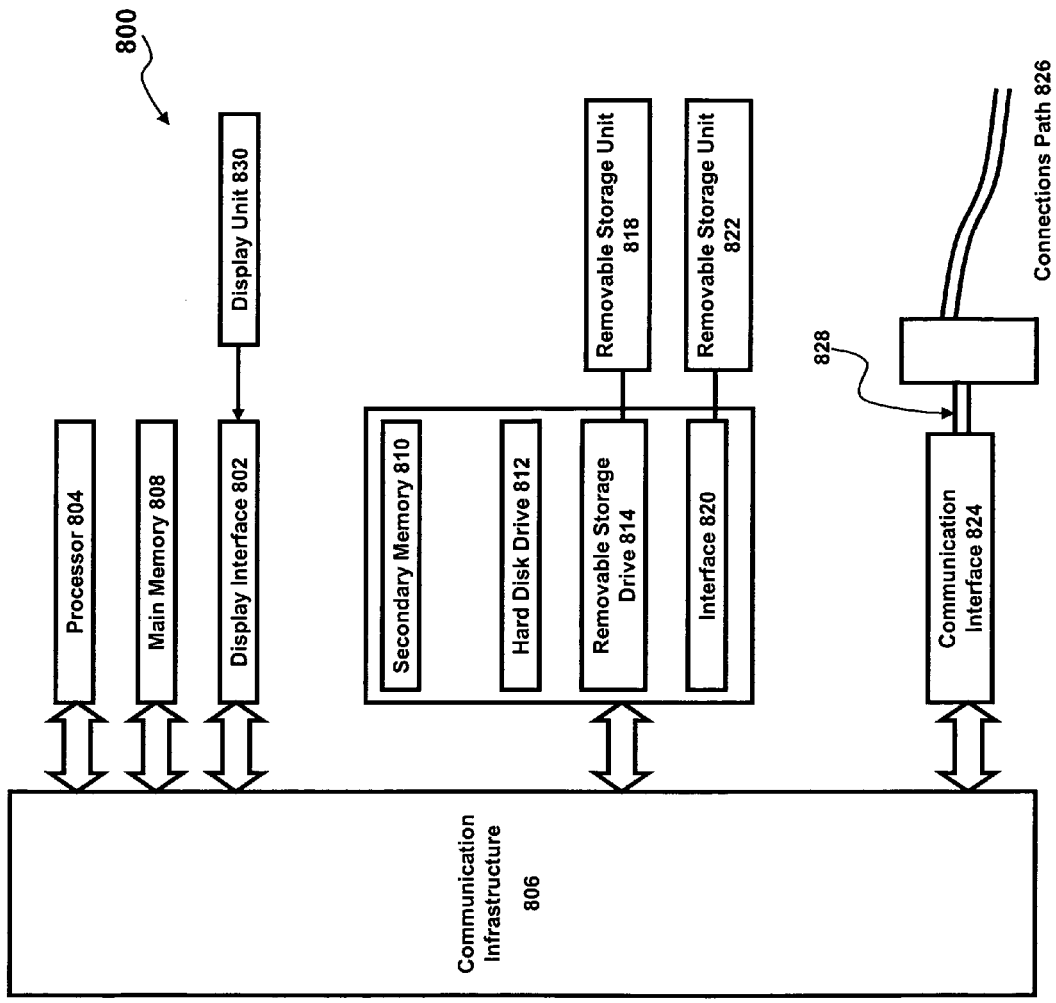
FIG. 8 is a block diagram of an exemplary computer system useful for implementing the present invention.

In fact, in one aspect, the invention is directed toward one or more computer systems capable of carrying out the functionality described herein. An example of a computer system 800 is shown in FIG. 8.

Computer system 800 includes one or more processors, such as processor 804. The processor 804 is connected to a communication infrastructure 806 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc. which is read by and written to by removable storage drive 814. As will be appreciated, the removable storage unit 818 includes a computer usable storage medium having stored therein computer software and/or data.

In alternative aspects, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 814, a hard disk installed in hard disk drive 812, and signals 828. These computer program products provide software to computer system 800. The invention is directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features of the present invention, as discussed herein. In particular, the computer programs, when executed, enable the processor 804 to perform the features of the present invention. Accordingly, such computer programs represent controllers of the computer system 800.

In an aspect where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

As will be appreciated by those skilled in the relevant art(s) after reading the foregoing description, one aspect the present invention would enable a doctor providing instructions to a patient on the usage of a particular prescription drug to provide for a way to listen to doctor's instructions at the time and place of actually taking the drug by the patient. Thus, in such an aspect, the doctor would have—next to their conventional prescription pad—a pad of Post-it® notes (or any other brand or kind of note paper with attaching means capable of being affixed to common object surfaces, which would then serve as the low-cost tag 102 of system 100) with each sheet of the pad having a pre-printed UUID barcode. The doctor could then, after writing a prescription on their conventional prescription pad, take one of the pre-printed, UUID-encoded Post-it® notes, scan it with their mobile device 104 (e.g., the camera on a Nokia N95 smartphone), and record a detailed message regarding directions for the drug's usage. The message would then be stored on media server 110 as shown in FIG. 2). Then, the patient can take the pre-printed, UUID-encoded Post-it® note and affix it to the prescription bottle once the prescription is filled. Then, at any time in the future when the patient desires to hear the doctor's instructions, they can scan the UUID-encoded tag 102 with their mobile device 104, and hear the recorded instructions (once retrieved from media server 110 as shown in FIG. 3 or FIG. 4).

While various aspects of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method for storing multimedia messages in order to facilitate contextual communications, comprising the steps of:
   (a) encoding a tag with a unique identifier, wherein said unique identifier is capable of being read by a mobile device;
   (b) receiving, at a registry server, said unique identifier from said mobile device;
   (c) accessing meta data associated with said tag from said registry server using said unique identifier;
   (d) sending said meta data associated with said tag from said registry server to said mobile device, thereby allowing a user to record, using said mobile device, a message associated with said unique identifier; and
   (e) storing said message onto a media server;
   wherein said tag is capable of being affixed to a physical, real-world object and thus allowing said message to be retrieved from said media server with said physical, real-world object in a time-shifted and space-shifted manner from when and where said message was recorded.

2. The method of claim 1, wherein said tag is a barcode tag encoded using one of the following standards: Data Matrix; MaxiCode; and Quick Response (QR) Code.

3. The method of claim 1, wherein said tag is a Radio Frequency Identification (RFID) tag.

4. The method of claim 1, wherein said unique identifier is in conformance with the Universally Unique Identifier (UUID) standard.

5. The method of claim 1, wherein said mobile device is a Near Field Communication-enabled (NFC-enabled) mobile telephone.

6. The method of claim 1, wherein said meta data associated with said tag includes at least one of the following: memory type; memory size; content type; access control; structure; and Uniform Resource Link.

7. The method of claim 1, further comprising the step of:
   (f) encoding said tag with a security code in addition to said unique identifier.

8. A method for reading multimedia messages in order to facilitate contextual communications, comprising the steps of:
   (a) receiving, at a registry server, a unique identifier from a mobile device, wherein said mobile device retrieved said unique identifier from a tag encoded with said unique identifier;
   (b) accessing meta data associated with said tag from said registry server using said unique identifier; and
   (c) sending said meta data associated with said tag from said registry server to said mobile device, thereby allowing a user of said mobile device to retrieve a message associated with said unique identifier from a media server;
   wherein said tag is affixed to a physical, real-world object and thus allowing said message to be retrieved from said media server with said physical, real-world object in a time-shifted and space-shifted manner from when and where said message was recorded.

9. The method of claim 8, wherein said tag is a barcode tag encoded using one of the following standards: Data Matrix; MaxiCode; and Quick Response (QR) Code.

10. The method of claim 8, wherein said tag is Radio Frequency Identification (RFID) tag.

11. The method of claim 8, wherein said unique identifier is in conformance with the Universally Unique Identifier (UUID) standard.

12. The method of claim 8, wherein said mobile device is a Near Field Communication-enabled (NFC-enabled) mobile telephone.

13. The method of claim 8, wherein said meta data associated with said tag includes at least one of the following: memory type; memory size; content type; access control; structure; and Uniform Resource Link.

14. The method of claim 8, further comprising the step of:
   (d) encoding said tag with a security code in addition to said unique identifier.

15. A system for facilitating contextual communications, comprising:
   (a) a plurality of tags, each encoded with a unique identifier capable of being read by a first mobile device and a second mobile device, wherein said first mobile device and said second mobile device each comprise a messenger application capable of sending and receiving meta data and multimedia data;
   (b) a registry server capable of storing meta data associated with each of said plurality of tags, and capable of communicating said meta data to said messenger applications; and
   (c) a media server capable of storing multimedia messages recorded using one of said first mobile device and said second mobile device, and capable of communicating with said messenger applications;
   wherein each of said plurality of tags is capable of being affixed to physical, real-world objects and thus allowing messages recoded by a first user using said first mobile device to be retrieved from said media server with said physical, real-world objects in a time-shifted and space-shifted manner by a second user using said second mobile device.

16. The system of claim 15, wherein at least one of said plurality of tags is a barcode tag encoded using one of the following standards: Data Matrix; MaxiCode; and Quick Response (QR) Code.

17. The system of claim 15, wherein at least one of said plurality of tags is a Radio Frequency Identification (RFID) tag.

18. The system of claim 15, wherein said unique identifiers are each in conformance with the Universally Unique Identifier (UUID) standard.

19. The system of claim 15, wherein said first and second mobile devices are Near Field Communication-enabled (NFC-enabled) mobile telephones.

20. The system of claim 15, wherein said meta data associated with each of said plurality of tags includes at least one of the following: memory type; memory size; content type; access control; structure; and Uniform Resource Link.

21. A computer program product comprising a non-transitory computer usable medium having control logic stored therein for causing a computer to facilitate contextual communications of multi-media messages using low-cost tags, said control logic comprising:
   first computer readable program code means for causing the computer to store meta data about a tag encoded with a unique identifier;
   second computer readable program code means for causing the computer to receive, from a mobile device, said unique identifier associated with said tag, wherein said unique identifier was read by said mobile device;
   third computer readable program code means for causing the computer to access meta data associated with said tag using said unique identifier;

fourth computer readable program code means for causing the computer to send said meta data associated with said tag to said mobile device;

wherein said tag is capable of being affixed to physical, real-world object and thus allows a message to be recoded and retrieved with said physical, real-world object in a time-shifted and space-shifted manner from when and where said message was recorded.

22. The computer program product of claim 21, wherein said tag is a barcode tag encoded using one of the following standards: Data Matrix; MaxiCode; and Quick Response (QR) Code.

23. The computer program product of claim 21, wherein said tag is a Radio Frequency Identification (RFID) tag.

24. The computer program product of claim 21, wherein said unique identifier is in conformance with the Universally Unique Identifier (UUID) standard.

25. The computer program product of claim 21, wherein said mobile device is a Near Field Communication-enabled (NFC-enabled) mobile telephone.

26. The computer program product of claim 21, wherein said meta data associated with said tag includes at least one of the following: memory type; memory size; content type; access control; structure; and Uniform Resource Link.

27. The computer program product of claim 21, further comprising:
fifth computer readable program code means for causing the computer to store a security code associated with said tag.

28. The method of claim 1, further comprising:
sending said message from said mobile device, via a wireless network to said media server.

29. The method of claim 8, further comprising:
retrieving said message from said media server, via a wireless network to said mobile device.

30. The system of claim 15, further comprising:
means for sending said message from said first mobile device, via a wireless network to said media server; and
means for retrieving said message from said media server, via the wireless network to said second mobile device.

31. The system of claim 15, wherein said registry server is capable of accessing said meta data associated with said tag by use of said unique identifier.

* * * * *